A. A. LOCKWOOD & M. R. A. SAMUEL.
PROCESS OF TREATING ORES.
APPLICATION FILED JAN. 11, 1909.
956,381.
Patented Apr. 26, 1910.
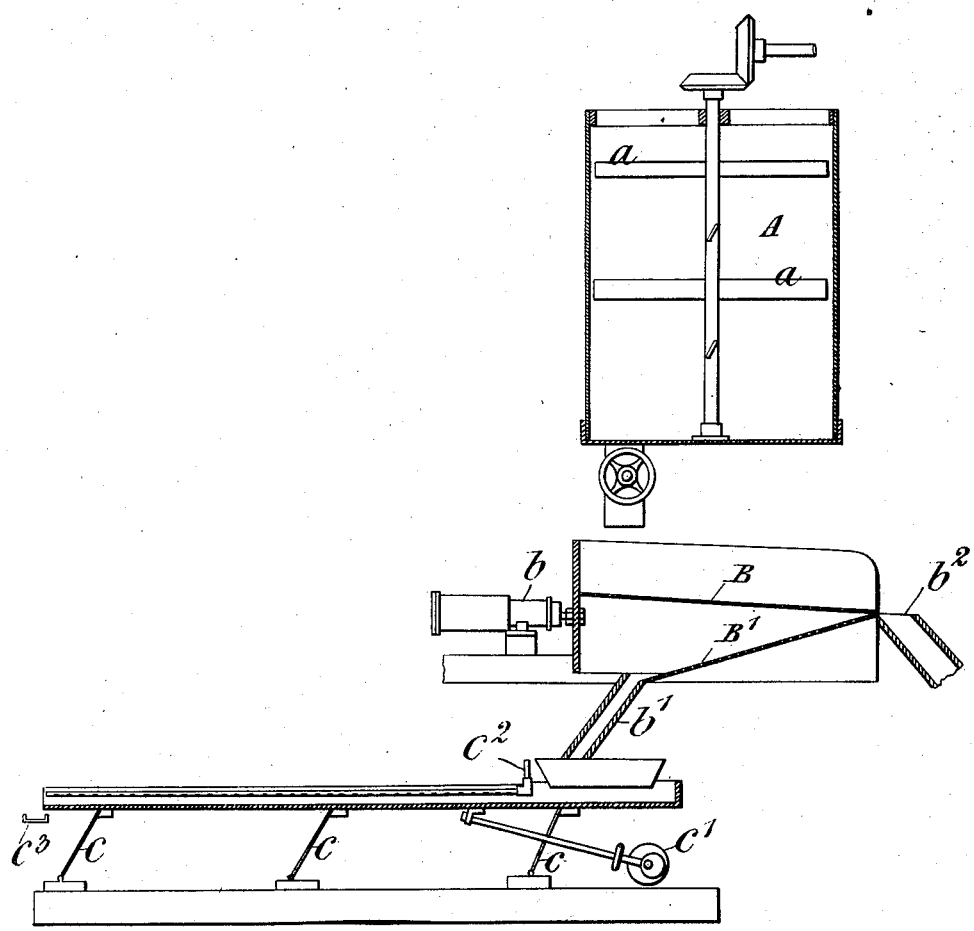

UNITED STATES PATENT OFFICE.

ALFRED ARTHUR LOCKWOOD AND MARCUS REGINALD ANTHONY SAMUEL, OF LONDON, ENGLAND, ASSIGNORS TO THE MUREX SYNDICATE, LIMITED, OF LONDON, ENGLAND.

PROCESS OF TREATING ORES.

956,381.  Specification of Letters Patent.  Patented Apr. 26, 1910.

Application filed January 11, 1909. Serial No. 471,716.

*To all whom it may concern:*

Be it known that we, ALFRED ARTHUR LOCKWOOD, chemist, and MARCUS REGINALD ANTHONY SAMUEL, merchant, subjects of the King of Great Britain, both residing at 12 Minories, in the city of London, England, have invented new and useful Improvements in Process of Treating Ores, of which the following is a specification.

The drawing shows an apparatus which may be used in carrying out our invention.

This invention relates to the treatment of such sulfid ores, tailings, middlings, or concentrates, as are difficult to separate into their constituents owing to their physical formation. This difficulty is usually caused by the pseudomorph formation of the ore; this is the case for example in complex lead and zinc ores such as Broken Hill ores.

According to this invention crushed ores, under which term it is intended to include tailings, middlings or concentrates, are subjected to a preliminary treatment of agitation with a reagent or reagents in such a manner that the incrustations are sufficiently attacked to free the metallic particles so that they can be classified by any known means. In some cases improved results may be obtained by first heating the ore or the like to a temperature preferably just below that of desulfurization. As reagents there are employed solutions of substances such as caustic alkali or sodium or potassium silicate which may be used either separately or in succession or in combination according to the ore to be treated. The quantity of the reagent and water necessary and the length of time required for the treatment will differ more or less according to the ore to be treated, it should be such that the incrustations are loosened while the metals remain undissolved.

As a comparative example of the treatment, a parcel of 2 tons of Broken Hill proprietary ore of a very complex formation was taken and crushed to about 40 mesh to the linear inch. 2,240 lbs. of this was treated with a solution containing about 5% of caustic soda and 1% of silicate of soda in the proportion of 25 lbs. of the solution to each 100 lbs. of ore. After agitating for about 30 minutes, the pulp was fed onto sizing screens and thence passed to a vanning table. The result of this treatment was as follows, the scale of the mesh to the linear inch being 60 and 80:—$103\frac{1}{4}$ lbs. of coarse (plus 60) galena (dried), 172 lbs. of fine (plus 80 and minus 80) galena and $43\frac{1}{4}$ lbs. of zinc lead middlings from the coarse and $36\frac{1}{4}$ lbs. middlings from the fine. The assay value of the galena was 76.8% lead with 3.9% zinc and the middlings contained free galena and free blende. The remaining 2240 lbs. of the ore was treated in the same manner including the agitation for 30 minutes with water but without the addition of caustic or silicate. The result was 88 lbs. of coarse (plus 60) galena, 134 lbs. of fine (plus 80 and minus 80) galena and 130 lbs. of zinc lead middlings from the coarse and 68 lbs. middlings from the fine. The assay value of the galena was 72% lead with 6.5% zinc, while the middlings appeared to be quite inseparable and further crushing would have been required to free the metallic particles from one another.

It is quite obvious that the treatment may be applied as in the example to the ore in bulk or the metallic particles may be concentrated by an oil or similar selective process and then treated and classified or of course the crushed ore may be taken and passed over the table before treatment getting as much free galena as possible, then taking off the table for treatment a large line of middlings containing the incrusted particles. These middlings are then treated as before described and passed over a table or otherwise classified. The particular method of treatment to be adopted will easily be found by the aid of a few experiments, which will show whether it is more profitable to treat the whole first, or to treat the middlings, or the concentrates or tailings, together or separately.

In place of using caustic soda direct it may be prepared *in situ*, thus the ore may be treated with a heated solution of oxid of lime and carbonate of soda.

The concentrates, middlings and tailings of ores which have undergone a selective process in which oils, soaps or the like have been used as the liquid and which even after treatment by known means (such as with soap emulsion or an alkaline emulsifying agent or by roasting) are still in an imperfect state for classification, are treated as herein before described with a reagent or reagents according to the ore to be treated. The silicates of sodium or potassium are especially suitable for zinc lead concentrates and may conveniently be added simultaneously with the emulsion or the like, agitation being necessary in all cases. Such treatment not only frees the ores from their incrustations as before but also overcomes or prevents the acquired tendency of the particles to adhere together due to various circumstances dependent on the liquid used whether oil, mineral oil or soap. The action of sodium or potassium silicate however when used alone is somewhat slow, preferably they are used in admixture with caustic alkali. In addition to freeing ores from incrustations the use of sodium or potassium silicates has the further advantage of precipitating any soluble salts present, thus preventing the water used from becoming "sick."

It is to be understood that it is not desired by this treatment to dissolve the metals, except possibly to a very slight degree, but merely to loosen the incrustations and to remove them by an abrasive treatment with a reagent, usually in the cold.

In dealing with ores for treatment, a few tests will be necessary to ascertain the degree of fineness to which they should be crushed before treatment and this will vary with the formation of the ore and may also be varied to suit the particular method of concentration to be employed, but speaking generally the ore should be left as coarsely crushed as possible and this for two reasons, viz: in order to reduce the amount of slimes formed and because of the decreasing advantage of such a treatment, for it will be obvious that with a pulverized ore the incrustations will no longer be present and the more finely the ore is crushed the more the incrustations will be broken down and the less need there will be for the treatment except when overcoming or preventing the acquired tendency of particles to adhere together when the ore is treated with oils or the like.

We are aware that the substances mentioned have before been used in the treatment of ores but not in a manner to produce the same results.

We are also aware that gold ores have been treated with a heated solution of a soluble silicate and with a soluble silicate and caustic alkali under pressure and we do not claim this.

In the drawing A is a vessel provided with an agitator $a$.

B is a sizing screen, B' a second and finer screen inclined in opposite direction to the first. The combined screens are directly connected to the piston of a reciprocating engine $b$.

$b'$, $b^2$ are delivery spouts.

The coarse and the finer ore is treated on a vanning table at different times. As shown the finer ore is delivered onto a vanning table.

C is a vanning table supported on springs $c$ and reciprocated by means of an eccentric $c'$.

$c^2$ indicates means for supplying water to the table and $c^3$ indicates a chute into which the heavier parts fall.

What we claim is:—

1. The herein described process of treating sulfid ores, which consists in crushing ores composed of friable sulfids in which the commingled grains or particles are bound together by a sulfid, agitating such crushed ores with an alkaline silicate solution to weaken the bonds between the grains of the commingled sulfids on cleavage lines so that they may be advantageously separated without excessive grinding and concomitant sliming and then subjecting said particles to separation and separate collection.

2. The herein described process of treating sulfid ores which consists in coarsely crushing ores composed of friable sulfids in which the commingled grains or particles are incrusted and which are bound together by a sulfid, agitating such crushed ores with an alkaline silicate solution to weaken the bonds between the grains of the commingled sulfids on cleavage lines and to free the metalliferous particles but not to dissolve or appreciably change the nature of either the said metalliferous particles or other particles with which they are associated, and then subjecting said particles to separation and separate collection.

3. The herein described process of treating ores, which consists in crushing incrusted zinc lead ores in which metalliferous particles are agglomerated by nature, agitating such crushed incrusted zinc lead ores with an alkaline silicate solution in a manner adapted to free the metalliferous particles but not to dissolve or appreciably change the nature of either the said metalliferous particles or the other said particles with which they are associated, and then subjecting said particles to separation and separate collection.

4. The herein described process, which consists in coarsely crushing incrusted zinc lead ores in which metalliferous particles are agglomerated by nature, agitating such crushed incrusted zinc lead ores with an alkaline silicate solution of a compound of a metal of at least 4% strength to free the metalliferous particles but not to dissolve or appreciably change the nature of either the said metalliferous particles or the other said particles with which they are associated, and then subjecting said particles to separation and separate collection.

ALFRED ARTHUR LOCKWOOD.
MARCUS REGINALD ANTHONY SAMUEL.

Witnesses:
ALFRED WRIGHT,
JOSEPH ANTHONY YGLESIAS.